United States Patent Office 3,492,557
Patented Jan. 27, 1970

3,492,557
STATIC SWITCHING CONTROLLERS FOR EFFECTING CONNECTION TO A D.C. ELECTRIC MOTOR AND DISCONNECTION FROM THE MOTOR OF A BATTERY
Christopher R. Brown, Ipswich, Suffolk, England, assignor to Ransomes Sims & Jefferies Limited, Ipswich, Suffolk, England
Filed Mar. 7, 1966, Ser. No. 532,456
Claims priority, application Great Britain, Mar. 12, 1965, 10,608/65
Int. Cl. H02p 7/06
U.S. Cl. 318—341      9 Claims

ABSTRACT OF THE DISCLOSURE

A control circuit for controlling the power to a motor from a direct current source has a first silicon controlled rectifier connected in series with the motor. A second silicon controlled rectifier is provided in the control circuit with a commutating capacitor connected in series with the second silicon controlled rectifier across the first silicon controlled rectifier for stopping the conduction of the first silicon controlled rectifier. A third silicon controlled rectifier is connected in series with a coil or resistor or both such that the combination is connected to the commutating capacitor and forms a series circuit through the capacitor from the current source to the first silicon controlled rectifier. The second silicon controlled rectifier connects the commutating capacitor across the first silicon controlled rectifier to turn it off. The third silicon controlled rectifier charges the commutating capacitor to such a polarity that it can turn off the first silicon controlled rectifier.

---

Figure 1:
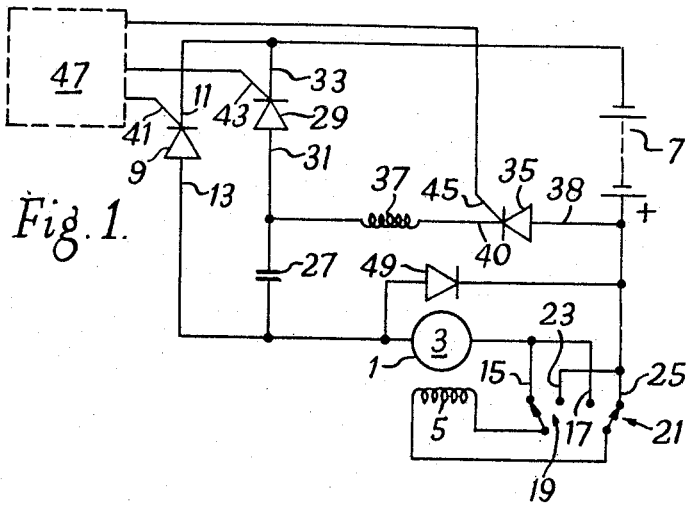

This invention relates to static switching controllers for effecting connection to a D.C. electric motor and disconnection from the motor of a battery. In particular the invention is concerned with static switching controllers for electrically driven industrial vehicles.

The main electrical components of an electrically driven industrial vehicle are a battery, a series connected electric motor and a controller. The battery is a heavy and costly item and should therefore be kept as small as is reasonably possible. The motor is normally a series connected D.C. electric motor which gives a high torque at low rate of revolutions and is therefore a most suitable traction power unit. The controller is the link between the battery and the motor and its function is to regulate the speed and acceleration of the vehicle by controlling the current through the motor.

The controllers of electrically driven vehicles are either dissipative or non-dissipative types. The dissipative types employ some form of resistor in series with the motor which is switched in steps or in an infinitely variable manner, as in the well known carbon pile controller, to reduce the initial voltage to and therefore the current through the motor. At low speeds the energy dissipated in the series resistor is considerable and may well be in excess of that used in the motor. It is for this reason that the dissipative form of controller is far from being an ideal link between the motor and the battery.

The static switching controller is of the non-dissipative type and controls the current flow through the motor by rapidly switching the current flow on and off, the ratio of "on time" to "off time" being increased to increase current flow.

A known form of static switching controller for effecting connection to a D.C. electric motor and disconnection from the motor of a D.C. source comprising a first thyristor means so connected with the motor and the source that when it is rendered conducting, current flows from the source through the motor, the periods of conduction of the first thyristor means determining the mean current through the motor, a second thyristor means, a capacitor means, the second thyristor means and the capacitor means being so connected in relation to the D.C. source and the D.C. electric motor that when the second thyristor means is rendered conducting at a time when the capacitor means is uncharged, forward charging of the capacitor means from the source takes place, and, means for reversing the charge on the capacitor means while the first thyristor means is in a conducting condition, the second thyristor means acting, when rendered conducting at a time when the capacitor means is reverse charged, to turn off the first thyristor means and to effect forward charging of the capacitor means.

According to the present invention in a static switching controller of the known kind, the means for effecting reversal of charge on the capacitor means includes, in series with the first thyristor means and the capacitor means, a three-terminal semi-conductor device and part at least of the voltage of the D.C. source.

The invention will now be described, by way of example, with reference to the accompanying drawings showing respective circuit arrangements of different forms of industrial vehicle static switching controller according to the invention.

In the drawings like parts have been accorded the same reference numerals.

Referring to FIGURE 1, a static switching controller for effecting connection to a D.C. electric motor 1 having an armature 3 and field coils 5 and disconnection from the motor of a battery 7 includes a first thyristor means 9 shown as a single thyristor but which may be in the form of a plurality of parallel connected thyristors, the cathode sides of which are represented by terminal 11 are connected to the negative side of the battery 7, whilst the anode sides as represented by terminal 13 are connected by way of the motor armature 3 to fixed contacts 15 and 17 of respective direction contactors 19 and 21, the movable contacts of which are connected to opposite ends of the motor field coils 5. Further fixed contacts 23 and 25 of the respective direction contactors are connected to the positive side of the battery.

Connected in parallel with the first thyristor means 9 is a branch consisting of a capacitor 27 and a second thyristor means 29, the latter comprising a single thyristor the anode 31 of which is connected to the capacitor whilst its cathode 33 is connected to the negative side of the battery 7. In parallel with the second thyristor is the battery, a third thyristor 35 in series with an inductor or a choke 37, the anode 38 of the third thyristor being connected to the positive side of the battery whilst its cathode 40 is connected to the choke.

The gate leads 41, 43 and 45 of the first, second and third thyristors are connected so as to be supplied with pulses from a pulse generator 47 the frequency of pulses supplied to the gate leads being variable. The lead of the third thyristor can alternatively be supplied with pulses from a separate source.

Connected in parallel across the armature and field coils is a diode 49 which is reverse biased with respect to the battery and is present to effect conduction away of reverse voltage transients which appear across the inductance of the armature and field every time the current to the motor is switched off.

At the commencement of operation, assuming the direction contactors 19 and 21 are positioned to permit current flow in one or the reverse direction, an initial current pulse is supplied from the pulse generator 47, which may be a free running multivibrator or other well known pulse generator, to the gate lead 43 of the second thyristor 29. The initial pulse from the generator switches the second thyristor to a conducting state whereupon the capacitor 27 charges to battery potential and the capacitor plate in electrical contact wtih the positive side of the battery through the armature and field coils of the motor 1 reaches the positive potential of the battery say +V volts. As the capacitor charges the current falls to zero whereupon the second thyristor is rendered nonconducting. The next pulse from the pulse generator 47 now triggers the first thyristor means 9 into a conducting state and this causes current to flow in the circuit of the battery 7, the motor armature 3 and field coils 5 and the first thyristor means 9. The battery is thus connected to the motor. It should be noted at this stage that as the first thyristor means are conducting, the plate of the capacitor which was at a positive potential, is short circuited by the first thyristor means to the potential at the negative side of the battery, say zero volts. As the capacitor at this time has has no discharge path, the other capacitor plate goes more negative to reach a potential of −V volts.

Shortly after the first thyristor means are triggered into conduction, a triggering pulse of short duration is applied to the gate of the third thyristor which is thus rendered conducting. The effect of this is that a circuit, hereinafter called the auxiliary circuit, is closed which consists of the first thyristor means, the battery, the third thyristor, the choke 37 and the capacitor 27. As the capacitor plate connected to the choke is at this moment at a more negative potential than the positive side of the battery, the third thyristor is forward biassed and current flows in the auxiliary circuit. The capacitor plate which is connected to the choke and which was at a potential of −V volts first rises to a potential of +V volts, and then the energy stored in the choke due to the current flowing in the auxiliary circuit further reverse charges the capacitor to a level at which the plate connected to the choke is at a potential of approximately +3V volts. The auxiliary circuit thus provides a charge reversal path for capacitor 27. The third thyristor triggering pulse has now ceased and the third thyristor is reverse biassed by the capacitor reverse voltage and is therefore in a non-conducting state.

The next pulse from the generator triggers the second thyristor 29 into a conducting state with the result that the capacitor discharges through the second thyristor. Part of the capacitor discharge current switches the first thyristor means 9 into a non-conducting state and the motor is disconnected from the battery. The capacitor continues first to discharge through the second thyristor, the battery and the electric motor and then to forward charge once more. Owing to inductance in the battery and the battery leads the capacitor forward charges to a voltage above the battery potential. If at this time the first and third thyristors were still in a conducting state, which they are not, the circuit of the battery 7, thyristor 35, the choke 37, the capacitor 27 and the first thyristor 9 would be an oscillatory circuit and the capacitor voltage would suffer initial oscillatory decay to battery voltage. However, as the third thyristor 35 is non-conducting at this time, having previously been rendered so by the reverse charging of the capacitor 27 and the first thyristor 9 is also non-conducting, oscillatory decay is prevented and the capacitor voltage remains at the peak to which it has swung above the battery voltage, at which voltage current flow through the second thyristor 29 having dropped sufficiently, the second thyristor is rendered non-conducting.

The next pulse again triggers the first thyristor means 9 into conduction and the motor again draws current from the battery. The third thyristor is triggered by a pulse of short duration just after the triggering of the first thyristor means and the capacitor 27 then reverse charges, but this time to a voltage above battery voltage because it reverse charged from the peak voltage achieved during forward charging thereof. The second thyristor 29 is then triggered and the capacitor discharges and thereby switches off the first thyristor means and then again forward charges once more to the peak voltage above the battery voltage. A steady cycle of operations has thus been established and continues. It will be seen that because of the high voltage developed on the capacitor during reverse charging thereof the necessary energy for switching off thyristor 9 can be stored in a capacitor of smaller capacitance than would be the case in the absence of such a high reverse voltage on the capacitor.

The frequency of the pulses from the generator 47 is variable and when increased the ratio of the time the motor is energised to the time it is not energised is increased and the mean current through the motor is thus increased.

Figure 2:
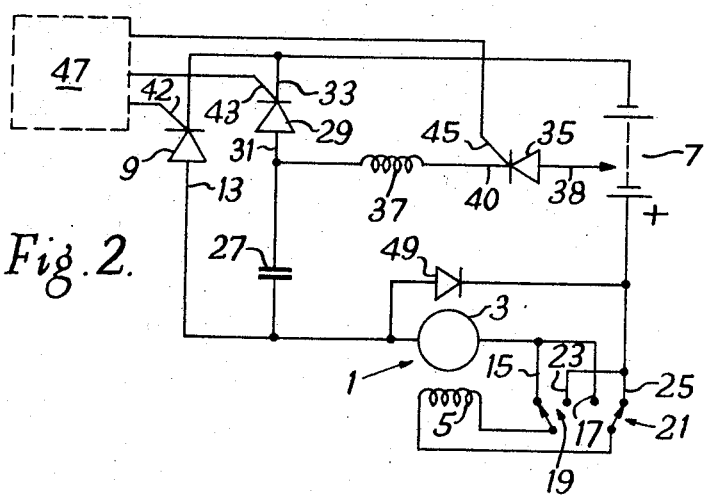

In a modification illustrated in FIGURE 2, instead of taking the anode of the third thyristor 35 to the positive side of the battery it is taken to an intermediate tapping on the battery. In this way the maximum capacitor voltage achieved during reverse charging thereof is limited to a suitable value in the range between battery voltage and three times battery voltages.

Figure 3:
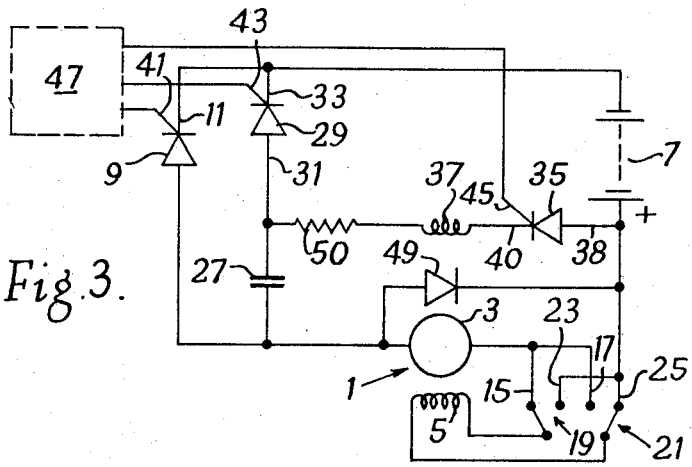

Instead of tapping the battery at an intermediate point, as indicated in FIGURE 3 the peak voltage of the capacitor could be limited by adding a suitable resistance 50 in series with the choke.

Figure 4:
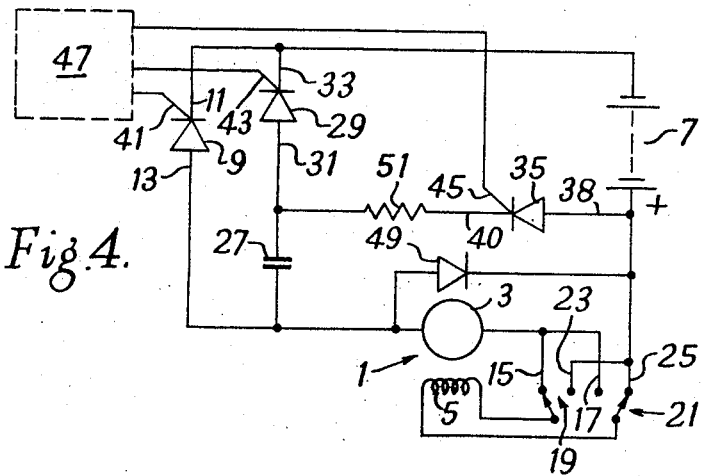

A further alternative circuit shown in FIGURE 4 is to connect the third thyristor anode with the positive side of the battery and replace the choke 37 with a resistor 51. This would have the effect that the capacitor would only reverse to battery voltage since it is resistor charged as distinct from being choke charged. However, a further effect is that this circuit would operate satisfactorily even if the initial pulse triggered the first instead of the second thyristor. The previously described circuits all require the initial pulse to trigger the second thyristor.

As previously mentioned, the trigger pulse for the third thyristor can be supplied from the pulse generator. Alternatively, the third thyristor can be arranged to conduct whenever the potential at the plate of the capacitor connected with the cathode of the third thyristor falls to a predetermined level below the potential at the negative side of the battery.

I claim:

1. A static switching controller for effecting connection to a D.C. electric motor and disconnection from the motor of a D.C. source, comprising a first thyristor means connected in series with the motor and the source, a capacitor means, a second thyristor means, connected in series with the capacitor means across the first thyristor means, for turning off the first thyristor means when the second thyristor means is fired and for forward charging the capacitor means, and means for reversing the charge on the capacitor means while the first thyristor means is in a conduction condition, characterized in that the means for reversing the charge on the capacitor means includes a three terminal semiconductor device and part at least of the source, connected in series with the first thyristor means and the capacitor means to provide a charge reversal path for the capacitor means.

2. A static switching controller as claimed in claim 1, wherein the three terminal semi-conductor device comprises a third thyristor means.

3. A static switching controller as claimed in claim 2, wherein the means for effecting reversal of charge on the capacitor means comprise the third thyristor in electrical series relationship with an inductor.

4. A static switching controller as claimed in claim 2, wherein the means for effecting reversal of charge on the capacitor means comprise the third thyristor in electrical series relationship with a resistor which limits the voltage established at the capacitor during conduction of the third thyristor means.

5. A static switching controller as claimed in claim 2, wherein the means for effecting reversal of charge on the capacitor means comprise the third thyristor means in electrical series relationship with an inductor and a resistor, the resistor effecting limitation of the voltage established on the capacitor when the third thyristor means are rendered conducting.

6. A static switching controller as claimed in claim 2, wherein the anode side of the third thyristor means is connected to the positive side of the D.C. source.

7. A static switching controller as claimed in claim 2, wherein the anode side of the third thyristor means is connected to an intermediate tapping between the positive and negative sides of the D.C. source.

8. A static switching controller as claimed in claim 2, wherein pulses applied to the gate electrodes of the first and second thyristor means to effect conduction thereof are derived from a pulse generator means whilst pulses applied to the gate electrode of the third thyristor means are derived from a separate source.

9. A static switching controller as claimed in claim 2, wherein the pulses applied to the gate electrodes of the first and second thyristor means to effect conduction thereof are derived from a pulse generator means whilst the gate electrode means of the third thyristor means are supplied with a pulse to effect conduction thereof upon the potential of the side of the capacitor which is connected wtih the cathode side of the third thyristor means falling to a predetermined value below the potential at the negative side of the battery.

References Cited

UNITED STATES PATENTS

| | | | |
|---|---|---|---|
| 3,191,113 | 6/1965 | Gargani | 318—345 X |
| 3,222,582 | 12/1965 | Heyman et al. | 318—341 X |
| 3,335,351 | 8/1967 | Morris | 318—341 |

ORIS L. RADER, Primary Examiner

A. G. COLLINS, Assistant Examiner

U.S. Cl. X.R.

318—345; 323—22